United States Patent
Hutto, Jr.

(10) Patent No.: US 8,951,021 B2
(45) Date of Patent: Feb. 10, 2015

(54) DUAL PUMP/DUAL BYPASS FUEL PUMPING SYSTEM

(71) Applicant: General Electric Company, Schenectady, NY (US)

(72) Inventor: Walter Decania Hutto, Jr., Cincinnati, OH (US)

(73) Assignee: General Electric Company, Schenectady, NY (US)

(*) Notice: Subject to any disclaimer, the term of this patent is extended or adjusted under 35 U.S.C. 154(b) by 217 days.

(21) Appl. No.: 13/744,914

(22) Filed: Jan. 18, 2013

(65) Prior Publication Data

US 2014/0205472 A1    Jul. 24, 2014

(51) Int. Cl.
*F04B 49/035* (2006.01)
*F04B 25/00* (2006.01)

(52) U.S. Cl.
CPC ........................... *F04B 25/00* (2013.01)
USPC ................ 417/62; 417/307; 137/599.11

(58) Field of Classification Search
USPC .......... 417/62, 302, 307; 137/115.23, 565.33, 137/115.13, 599.03, 599.08, 599.11; 60/39.281
See application file for complete search history.

(56) References Cited

U.S. PATENT DOCUMENTS

| | | | |
|---|---|---|---|
| 2,835,323 A * | 5/1958 | Booth | 137/565.33 |
| 3,771,314 A | 11/1973 | Rose et al. | |
| 4,397,148 A | 8/1983 | Stockton et al. | |
| 4,607,486 A | 8/1986 | Cole | |
| 4,794,755 A | 1/1989 | Hutto | |
| 6,328,056 B1 | 12/2001 | Kumar et al. | |
| 7,887,302 B2 | 2/2011 | Hutto | |
| 8,302,406 B2 | 11/2012 | Baker | |
| 2010/0089025 A1 | 4/2010 | Baker | |
| 2011/0162724 A1 | 7/2011 | Kleckler | |
| 2012/0234014 A1 | 9/2012 | Reuter et al. | |
| 2012/0271527 A1 | 10/2012 | Zebrowski et al. | |

* cited by examiner

*Primary Examiner* — Charles Freay
*Assistant Examiner* — Patrick Hamo
(74) *Attorney, Agent, or Firm* — General Electric Company; Pamela A. Kachur

(57) ABSTRACT

An example dual pump/dual bypass fuel pumping assembly may include a dual bypass valve including a first inlet port, a second inlet port, and a movable spool arranged to modulate fuel flow from the first inlet port to a first bypass port and a first discharge port and arranged to modulate fuel flow from the second inlet port to a second bypass port and a second discharge port based on a position of the movable spool; a first pump arranged to supply fuel to the first inlet port; a second pump arranged to supply fuel to the second inlet port; a supply header arranged to supply fuel to the first pump and the second pump; a bypass header fluidicly coupled to the first bypass port, the second bypass port, and the supply header; and/or a discharge header fluidicly coupled to the first discharge port and the second discharge port.

19 Claims, 5 Drawing Sheets

DUAL PUMP/DUAL BYPASS FUEL PUMPING SYSTEM

BACKGROUND

The subject matter disclosed herein relates generally to fuel systems for internal combustion engines, and, more specifically, to fuel pumping systems for gas turbine engines, such as aircraft engines.

Fuel pumping systems on gas turbine engines may utilize a single positive displacement pump operating in conjunction with a bypassing control in which excess fuel flow is recirculated to the pump inlet. Under some conditions (e.g., cruise), the amount of fuel being pumped may far exceed the amount of fuel required, and a majority of the pumped flow may be recirculated.

The problem: Continual pumping to required pressure followed by recirculation of flow to the pump inlet at low pressure may result in excess fuel pumping horsepower consumption and may reduce efficiency in terms of engine specific fuel consumption (SFC) and heat imparted to the fuel system.

BRIEF DESCRIPTION OF THE INVENTION

At least one solution for the above-mentioned problem(s) is provided by the present disclosure to include example embodiments, provided for illustrative teaching and not meant to be limiting.

An example dual pump/dual bypass fuel pumping assembly according to at least some aspects of the present disclosure may include a dual bypass valve including a first inlet port selectively connectable to a first bypass port and a first discharge port, a second inlet port selectively connectable to a second bypass port and a second discharge port, and a movable spool arranged to modulate fuel flow from the first inlet port to the first bypass port and the first discharge port and arranged to modulate fuel flow from the second inlet port to the second bypass port and the second discharge port based at least in part on a position of the movable spool; a first pump arranged to supply fuel to the first inlet port; a second pump arranged to supply fuel to the second inlet port; a supply header arranged to supply fuel to the first pump and the second pump; a bypass header fluidically coupled to the first bypass port, the second bypass port, and the supply header; and a discharge header fluidically coupled to the first discharge port and the second discharge port. In a first position, the movable spool may modulate fuel flow from the first inlet port between the first discharge port and the first bypass port and may direct substantially all fuel flow from the second inlet port to the second bypass port. In a second position, the movable spool may direct substantially all fuel flow from the first inlet port to the first discharge port and may modulate fuel flow from the second inlet port between the second discharge port and the second bypass port.

An example fuel supply system according to at least some aspects of the present disclosure may include a dual pump/dual bypass fuel pumping assembly including a dual bypass valve including a first inlet port selectively connectable to a first bypass port and a first discharge port, a second inlet port selectively connectable to a second bypass port and a second discharge port, and a movable spool arranged to modulate fuel flow from the first inlet port to the first bypass port and the first discharge port and arranged to modulate fuel flow from the second inlet port to the second bypass port and the second discharge port based at least in part on a position of the movable spool, a first positive displacement pump arranged to supply fuel to the first inlet port, a second positive displacement pump arranged to supply fuel to the second inlet port, a supply header arranged to supply fuel to the first pump and the second pump, a bypass header fluidically coupled to the first bypass port, the second bypass port, and the supply header, a discharge header fluidically coupled to the first discharge port and the second discharge port; and a control valve assembly fluidically coupled to the dual bypass valve to modulate fuel pressure in the discharge header, the control valve assembly including an electrohydraulic servo valve operatively coupled to an electronic engine controller, and a servo valve operatively coupled to direct pressurized fuel to both ends of the moveable spool of the dual bypass valve to position the movable spool as directed by the electronic engine controller, the servo valve being operatively coupled to be actuated by pressurized fuel received from the electrohydraulic servo valve.

An example fuel supply system according to at least some aspects of the present disclosure may include a dual pump/dual bypass fuel pumping assembly including a dual bypass valve including a first inlet port selectively connectable to a first bypass port and a first discharge port, a second inlet port selectively connectable to a second bypass port and a second discharge port, and a movable spool arranged to modulate fuel flow from the first inlet port to the first bypass port and the first discharge port and arranged to modulate fuel flow from the second inlet port to the second bypass port and the second discharge port based at least in part on a position of the spool, a first positive displacement pump arranged to supply fuel to the first inlet port, a second positive displacement pump arranged to supply fuel to the second inlet port, a supply header arranged to supply fuel to the first pump and the second pump, a bypass header fluidically coupled to the first bypass port, the second bypass port, and the supply header, a discharge header fluidically coupled to the first discharge port and the second discharge port; and/or a control valve assembly fluidically coupled to the dual bypass valve. The control valve assembly may include a metering valve operatively disposed in the discharge header, the metering valve modulating fuel flow through the discharge header, an electrohydraulic servo valve operatively coupled to position the metering valve as directed by an electronic engine controller, and/or a spool valve operatively coupled to the metering valve and the dual bypass valve to direct pressurized fuel to both ends of the moveable spool of the dual bypass valve to position the movable spool to maintain a desired pressure differential across the metering valve.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

Figure 1:
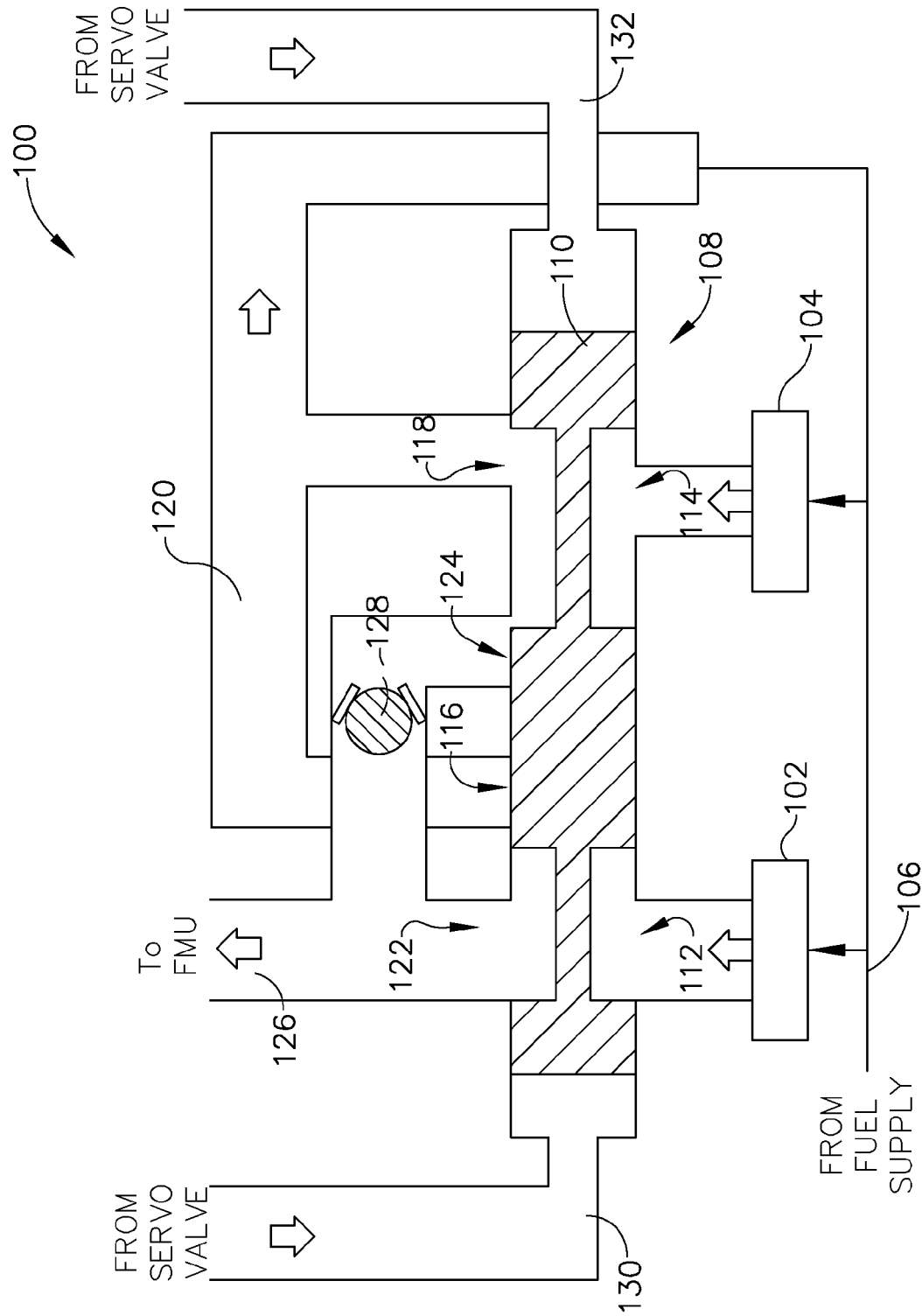
FIG. 1 is a schematic view of an example dual pump/dual bypass fuel pumping assembly including a movable spool in an intermediate flow position.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, fuel systems for internal combustion engines, and more specifically fuel pumping systems for gas turbine engines, such as aircraft engines. Generally, some example embodiments according to at least some aspects of the present disclosure may be configured to limit the amount of fuel pumped to metering system required pressure at some or all operating conditions.

The present disclosure contemplates that some aircraft engine fuel systems utilize bypassing controls operating with a positive displacement pump sized for maximum flow demand, which may result in excess flow, wasted horsepower, and/or excessive heat generation at cruise conditions (e.g., 10-15% of maximum power).

As described in detail below, some example embodiments according to at least some aspects of the present disclosure may include a fuel system utilizing two (or more) fuel pumps operating in conjunction with a bypass valve assembly (e.g., a dual bypass valve assembly). Some example dual pump/dual bypass configurations may allow a fuel system to operate at reduced drive horsepower at some operating conditions, which may contribute to improved engine efficiency (e.g., specific fuel consumption for aircraft engines) and/or reduced heat addition to the fuel due to pumping and recirculation. In some example embodiments, reduced heat addition to the fuel may allow reduced operating temperatures for systems and components cooled by the fuel, such as lubricating oil.

Some example embodiments according to at least some aspects of the present disclosure may include a first pump and a second pump. For example, the first pump may include a relatively smaller, positive displacement fuel pump (e.g., relatively lower pumping capacity) and/or the second pump may include a relatively larger, positive displacement fuel pump (e.g., relatively higher pumping capacity). The first pump may be sized to supply the required fuel flow for a particular operating condition. The second pump, which may supplement the fuel flow from the first pump, may be sized such that the combined flow from both the first pump and the second pump provides the maximum expected demand flow. The fuel flow from the pumps may be delivered to a servo actuated dual bypassing valve assembly, which may be arranged to bypass fuel flow in excess of engine need back to the inlet of the pumps.

In some example embodiments according to at least some aspects of the present disclosure, at cruise conditions, the first pump may supply substantially all of the fuel consumed by the engine, while the second pump may be in substantially full bypass. When in full bypass, the second pump may produce a very minimal fuel pressure rise and/or may consume very minimal horsepower. During high engine fuel flow demand (e.g., takeoff), the second pump may augment fuel flow from the first pump such that the combined flow from both pumps satisfies the required system pressure and flow.

Figure 2:
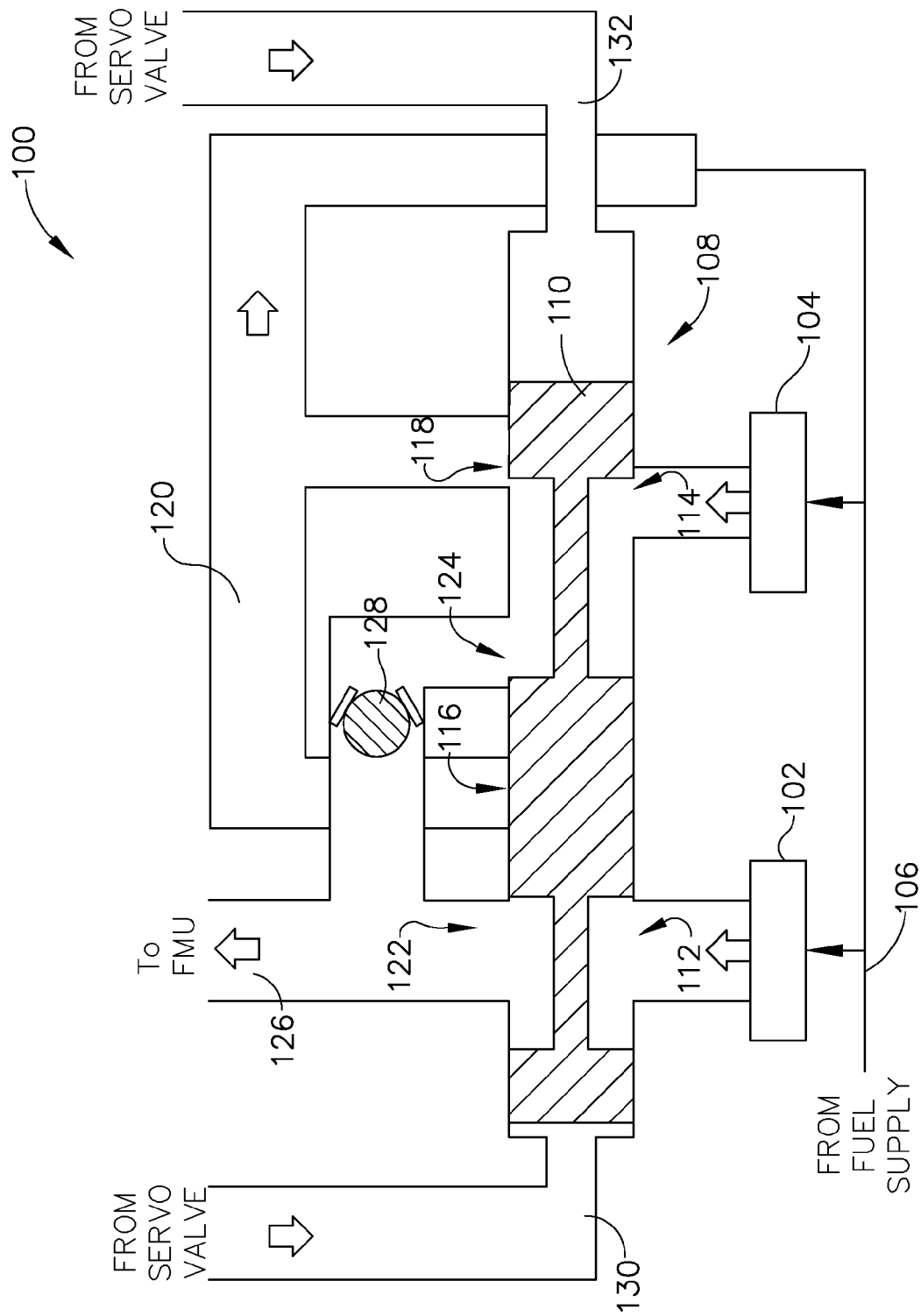
FIG. 2 is a schematic view of an example dual pump/dual bypass fuel pumping assembly including a movable spool in a high flow position.
Figure 3:
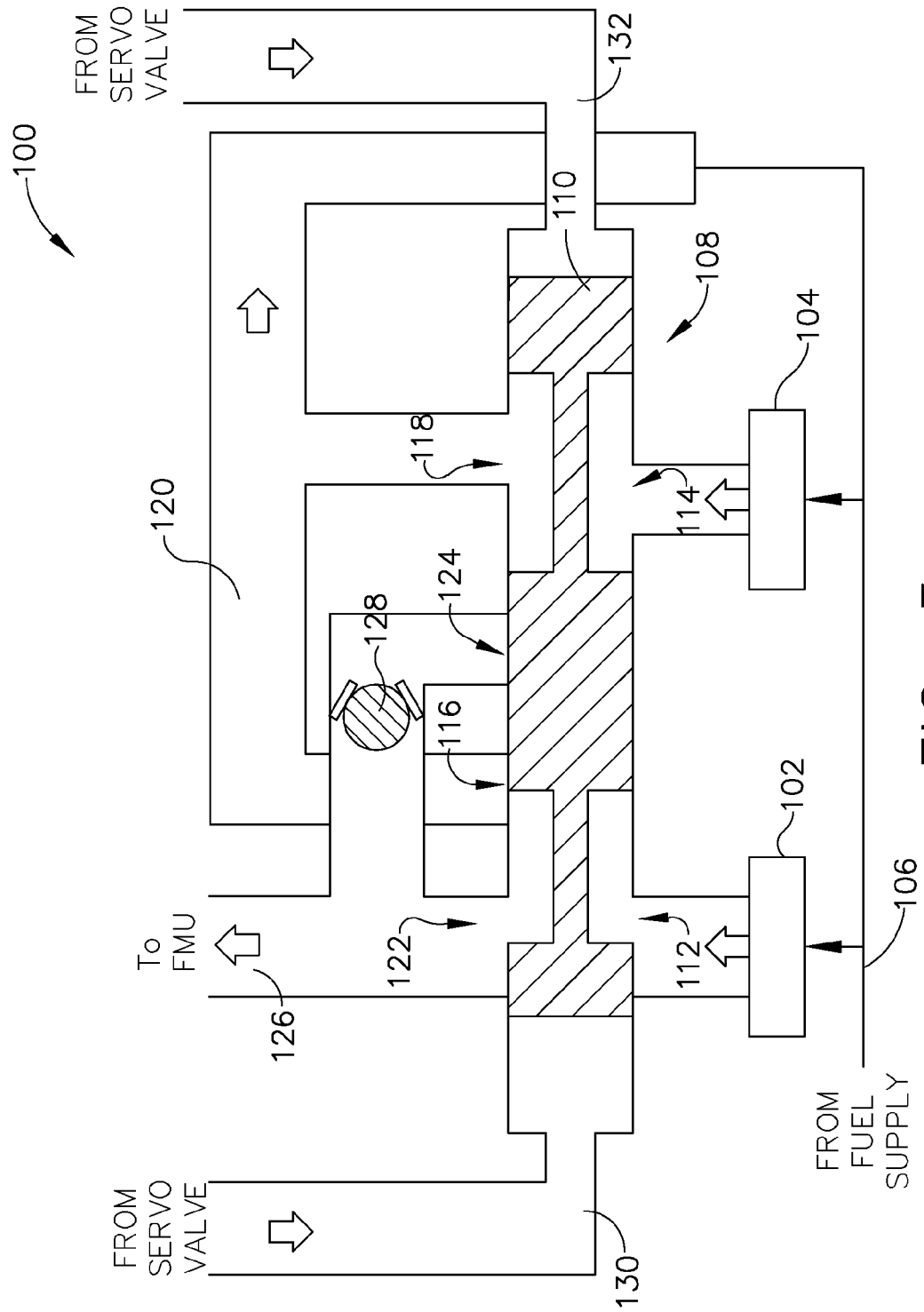
FIG. 3 is a schematic view of an example dual pump/dual bypass fuel pumping assembly including a movable spool in a low flow position.

FIG. 1 is a schematic view of an example dual pump/dual bypass fuel pumping assembly 100 including a movable spool 110 in an intermediate flow position, according to at least some aspects of the present disclosure. FIG. 2 is a schematic view of example dual pump/dual bypass fuel pumping assembly 100 including movable spool 110 in a high flow high flow position, according to at least some aspects of the present disclosure. FIG. 3 is a schematic view of example dual pump/dual bypass fuel pumping assembly 100 including movable spool 110 in a low flow position, according to at least some aspects of the present disclosure.

Some example dual pump/dual bypass fuel pumping assemblies 100 may include a dual bypass valve 108. An example dual bypass valve 108 may include a first inlet port 112, which may be selectively connectable to a first bypass port 116 and/or a first discharge port 122. Dual bypass valve 108 may include a second inlet port 114, which may be selectively connectable to a second bypass port 118 and/or a second discharge port 124. Dual bypass valve 108 may include a movable spool 110 arranged to modulate fuel flow from first inlet port 112 to first bypass port 116 and/or first discharge port 122 and/or arranged to modulate fuel flow from second inlet port 114 to second bypass port 118 and/or second discharge port 124, based at least in part on a position of the movable spool 110.

Some example dual pump/dual bypass fuel pumping assemblies 100 may include a first pump 102 arranged to supply fuel to first inlet port 112 and/or a second pump 104 arranged to supply fuel to second inlet port 114. In some example embodiments, first pump 102 and/or second pump 104 may comprise a positive displacement pump, such as a gear pump, a vane pump, or a gerotor ("generated rotor") pump.

Some example dual pump/dual bypass fuel pumping assemblies 100 may include a supply header 106 arranged to supply fuel to first pump 102 and/or second pump 104. Some example dual pump/dual bypass fuel pumping assemblies 100 may include a bypass header 120 fluidically coupled to first bypass port 116, second bypass port 118, and/or supply header 106. Some example dual pump/dual bypass fuel pumping assemblies 100 may include a discharge header 126 fluidically coupled to first discharge port 122 and/or second discharge port 124.

Some example dual pump/dual bypass fuel pumping assemblies 100 may include a check valve 128 operatively disposed in discharge header 126, such as fluidically between first discharge port 122 and second discharge port 124. Check valve 128 may be arranged to substantially prevent flow from first discharge port 122 to second discharge port 124 and/or to allow flow from second discharge port 124 through discharge header 126.

In some example embodiments according to at least some aspects of the present disclosure, the position of movable spool 110 within dual bypass valve 108 may determine the amount and/or pressure of fuel directed through discharge header 126 (which may be consumed by an associated internal combustion engine) and/or the amount and/or pressure of fuel directed to bypass header 120 (which may be recirculated through first pump 102 and/or second pump 104). For example, with movable spool 110 in the position illustrated in FIG. 3 (e.g., "first" or "low flow" position), movable spool 110 may direct at least a portion of the fuel flow from first inlet port 112 to first bypass port 116 and/or substantially all fuel flow from second inlet port 114 to second bypass port 118. In the low flow position, movable spool 110 may direct at least some of the fuel flow from first inlet port 112 to first discharge port 122. In other words, movable spool 110 may modulate fuel flow from first inlet port 112 between first discharge port 122 and first bypass port 116 and may direct substantially all fuel flow from second inlet port 114 to second bypass port 118.

With movable spool 110 in the position illustrated in FIG. 2 (e.g., "second" or "high flow" position), movable spool 110 may direct substantially all fuel flow from first inlet port 112 to first discharge port 122 and/or substantially all fuel flow from second inlet port 114 to second discharge port 124. More specifically, in the second position, movable spool 110 may direct substantially all fuel flow from first inlet port 112 to first discharge port 122 and may modulate fuel flow from second inlet port 114 between second discharge port 124 and second bypass port 118.

With movable spool 110 in an intermediate flow position as illustrated in FIG. 1, movable spool 110 may direct substantially all of the fuel flow from first inlet port 112 to first discharge port 122, at least some fuel flow from second inlet port 114 to second discharge port 124, and/or at least some fuel flow from second inlet port 114 to second bypass port 118.

Some example dual pump/dual bypass fuel pumping assemblies 100 may include a first control line 130 operatively coupled to convey pressurized fuel from a control valve assembly (e.g., control valve assembly 300 of FIG. 4 and/or control valve assembly 400 of FIG. 5) to dual bypass valve 108 to move movable spool 110 towards the high flow position. Some example dual pump/dual bypass fuel pumping assemblies 100 may include a second control line 132 operatively coupled to convey pressurized fuel from a control valve assembly to dual bypass valve 108 to move movable spool 110 towards the low flow position. More specifically, the control valve assembly may be configured to raise the pressure delivered to dual bypass valve 108 via one of first control line 130 and second control line 132 while reducing the pressure in the other of first control line 130 and second control line 132. For example, to move movable spool 110 towards the high flow position, the control valve assembly may raise the pressure in first control line 130 while lowering the pressure in second control line 132. Similarly, to move movable spool 110 towards the low flow position, the control valve assembly may raise the pressure in second control line 132 while lowering the pressure in first control line 130.

Figure 4:
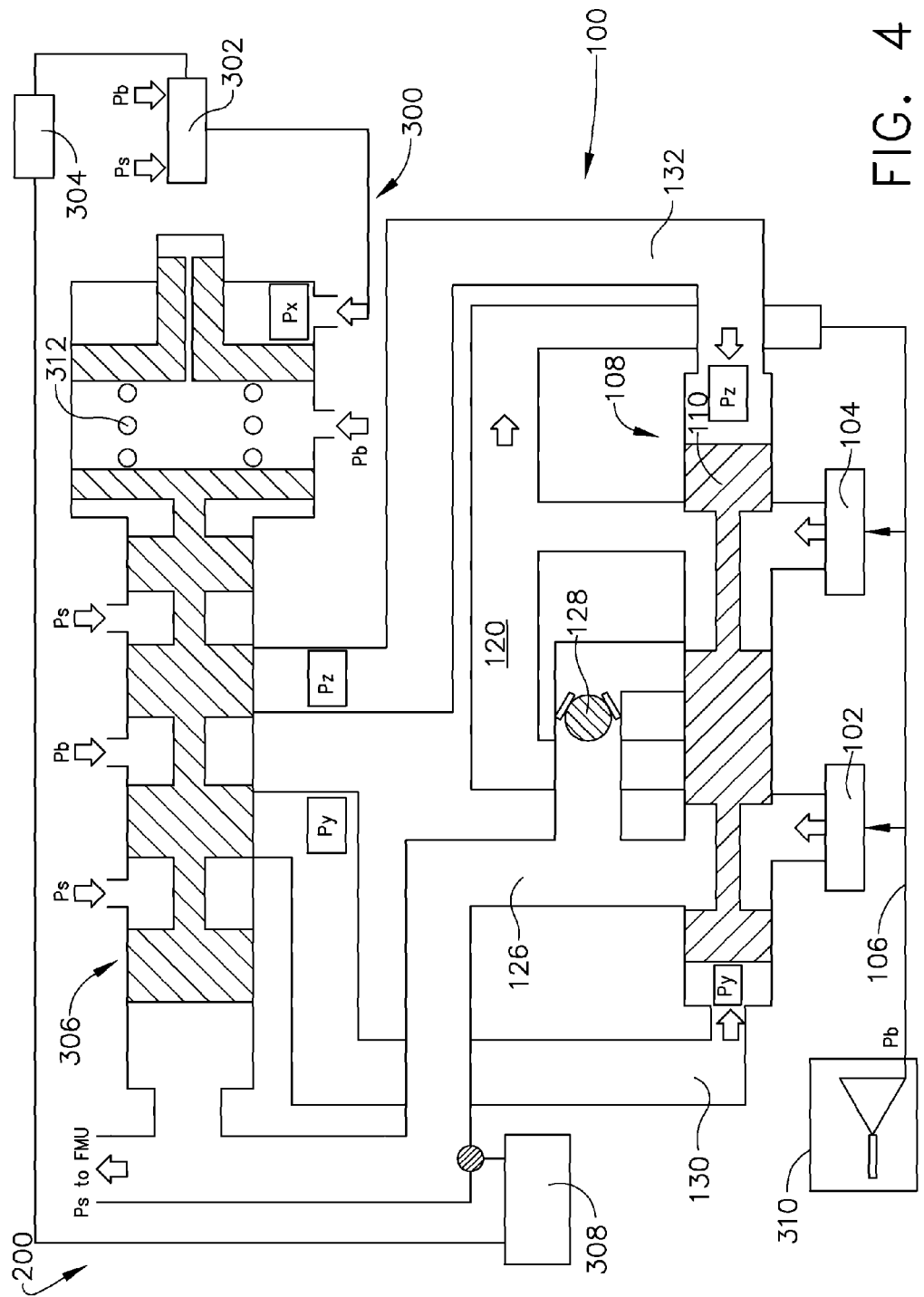
FIG. 4 is a schematic view of an example fuel supply system.

FIG. 4 is a schematic view of an example fuel supply system 200, according to at least some aspects of the present disclosure. Fuel supply system may include a dual pump/dual bypass fuel pumping assembly 100 and/or a control valve assembly 300, which may be fluidically coupled to dual bypass valve 108 to modulate fuel pressure in discharge header 126. Generally, the example embodiment illustrated in FIG. 4 may be particularly advantageous in fuel systems requiring maintenance of adequate pressure for proper operation of downstream multiple metering paths.

Some example control valve assemblies 300 may include an electrohydraulic servo valve (EHSV) 302 operatively coupled to an electronic engine controller 304 (e.g., a full authority digital engine controller ("FADEC")) and/or a servo valve operatively coupled to direct pressurized fuel to the dual bypass valve via first control line 130 and second control line 132 to position the movable spool of the dual bypass valve as directed by the electronic engine controller. Servo valve 306 may be operatively coupled to be actuated by pressurized fuel received from the electrohydraulic servo valve.

Some example control valve assemblies 300 may include a pressure transducer 308 operatively coupled to discharge header 126 and arranged to provide an electrical signal to electronic engine controller 304 corresponding to fuel pressure in discharge header 126.

An example fuel supply system 200 may operate as follows. Fuel (e.g., from aircraft tanks) may be supplied to a boost pump 310, which may raise the pressure at boost pump discharge (Pb) to a level suitable for charging first pump 102 and/or second pump 104. The electronic engine controller 304 may schedule the fuel pressure (Ps) to be supplied to the fuel metering unit (FMU) based at least in part upon sensed engine parameters (e.g., compressor discharge pressure). Pressure transducer 308 may inform the electronic engine controller 304 of the current, actual Ps pressure in order to close the pressure setting loop. In some example embodiments, Ps may be scheduled such that Ps is generally minimized (accounting for accuracy and safety considerations) at some operating conditions, which may result in reduced power consumption by first pump 102 and/or second pump 104.

Electronic engine controller 304 in conjunction with EHSV 302 may set pressure Px. For example, electronic engine controller 304 may send an electrical command to EHSV 302, which may set Px using input pressures Ps and Pb. Variation of Px by EHSV 302 may cause a variation in the compression of a spring 312, thereby changing the force applied to the right end of servo valve 306. Since the spring force may be balanced by the force created by Ps acting in the left end of servo valve 306, Ps may be directly related to Px. Generally, controlling Ps at or near the lowest value required for any operating condition may result in reduced pump drive horsepower with attendant improvement in overall engine efficiency.

Servo valve 306 is supplied with Ps and Pb, which may be directed to dual bypass valve 108 via first control line 130 and/or second control line 132. A difference between actual Ps and desired Ps may result in movement in servo valve 306, which may result in a corresponding change in Py (supplied to dual bypass valve 108 via first control line 130) and Pz (supplied to dual bypass valve 108 via second control line 132). Unbalanced pressures Py and Pz may cause movable spool 110 to move within dual bypass valve 108, thereby varying fuel flow to discharge header 126 and fuel flow recirculated via bypass header 120. The variation of fuel flow to discharge header 126 may adjust the actual Ps to the scheduled Ps.

While the above describes the basic electronic control loop, it will be understood that a substantial change in flow delivered by the FMU to the engine may result in a corresponding change in Ps, which may cause a response of the system to restore Ps control. Such an arrangement may provide improved response over an alternative system relying solely on a basic electronic pressure control loop.

Figure 5:
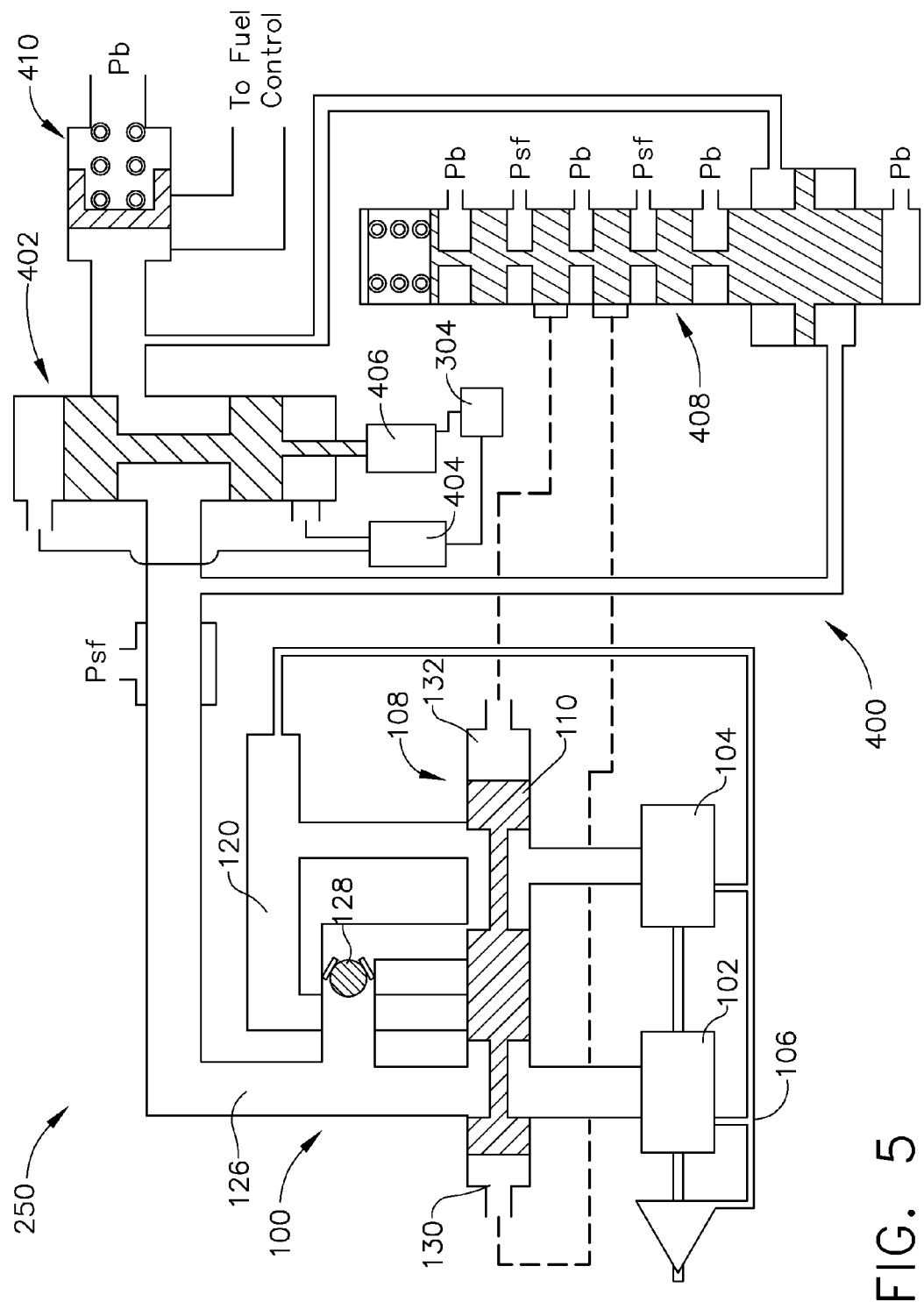
FIG. 5 is a schematic view of an example fuel supply system including an alternative control valve assembly, all in accordance with at least some aspects of the present disclosure.

FIG. 5 is a schematic view of an example fuel supply system 250 including an alternative control valve assembly 400, according to at least some aspects of the present disclosure. Control valve assembly 400 may include a metering valve 402 operatively disposed in the discharge header 126. Metering valve 402 may be configured to modulate fuel flow through discharge header 126. An EHSV 404 may be operatively coupled to metering valve 402 to position metering valve 402 as directed by electronic engine controller 304. Electronic engine controller 304 may receive an electrical signal corresponding to the position of metering valve 402 from a linear variable differential transformer (LVDT) 406, which may be operatively coupled to metering valve 402. Generally, electronic engine controller 304 may specify the desired position of metering valve 402 based upon fuel demand.

Some example control valve assemblies 400 may include a spool valve 408 operatively coupled to metering valve 402 and/or dual bypass valve 108. Spool valve 408 may be configured to direct pressurized fuel to first control line 130 and/or second control line 132 of dual bypass valve 108 to position movable spool 110 of dual bypass valve 108 to maintain a desired pressure differential across metering valve 402 by changing flow into discharge header 126. Spool valve 408 may be actuated using fuel pressure upstream and downstream of metering valve 402 along with filtered high pressure fuel (Psf) and/or fuel at boost pump pressure (Pb). Generally, spool valve 408 may be configured to maintain a substantially constant differential pressure across metering valve 402, regardless of fuel flow therethrough.

Some example control valve assemblies 400 may include a pressurizing valve 410 downstream of metering valve 402. Pressurizing valve 410 may be configured to provide a predetermined downstream reference pressure to metering valve 402.

Various example embodiments according to at least some aspects of the present disclosure may be generally applicable to any gas turbine engine and may be particularly advantageous to commercial engines, where reducing fuel burn at cruise may have substantial benefits. Superior thermal management (e.g., less fuel heating due to pumping and recirculation) may offer particular advantages where components are cooled using fuel (e.g., military and commercial engines). Embodiments providing compatibility with a throttling control may allow independent control of multiple flow paths to the combustor. Some embodiments may provide substantially infinite variability in scheduling via software (e.g., in electronic engine controller 304).

Generally, regulating fuel pressure according to engine need may limit wasted pump drive horsepower. Use of the bypassing capability may enable the pumping system to be used in conjunction with a throttling-type FMU, which may be more adaptable to the needs of combustion systems requiring multiple independently variable flow paths as compared to a bypassing control operating with a single positive displacement pump.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dual pump/dual bypass fuel pumping assembly, comprising:
   a dual bypass valve comprising
      a first inlet port selectively connectable to a first bypass port and a first discharge port,
      a second inlet port selectively connectable to a second bypass port and a second discharge port, and
      a movable spool arranged to modulate fuel flow from the first inlet port to the first bypass port and the first discharge port and arranged to modulate fuel flow from the second inlet port to the second bypass port and the second discharge port based at least in part on a position of the movable spool;
   a first pump arranged to supply fuel to the first inlet port;
   a second pump arranged to supply fuel to the second inlet port;
   a supply header arranged to supply fuel to the first pump and the second pump;
   a bypass header fluidically coupled to the first bypass port, the second bypass port, and the supply header; and
   a discharge header fluidically coupled to the first discharge port and the second discharge port;
   wherein, in a first position, the movable spool modulates fuel flow from the first inlet port between the first discharge port and the first bypass port and directs substantially all fuel flow from the second inlet port to the second bypass port; and
   wherein, in a second position, the movable spool directs substantially all fuel flow from the first inlet port to the first discharge port and modulates fuel flow from the second inlet port between the second discharge port and the second bypass port.

2. The fuel pumping assembly of claim 1, further comprising a first control line operatively coupled to convey pressurized fuel from a control valve assembly to the dual bypass valve to move the movable spool towards the first position.

3. The fuel pumping assembly of claim 1, further comprising a second control line operatively coupled to convey pressurized fuel from a control valve assembly to the dual bypass valve to move the movable spool towards the second position.

4. The fuel pumping assembly of claim 1, further comprising a check valve operatively disposed in the discharge header, the check valve being arranged to substantially prevent flow from the first discharge port to the second discharge port and to allow flow from the second discharge port through the discharge header.

5. The fuel pumping assembly of claim 1, wherein the first pump comprises a positive displacement pump.

6. The fuel pumping assembly of claim 1, wherein the second pump comprises a positive displacement pump.

7. A fuel supply system, comprising:
   a dual pump/dual bypass fuel pumping assembly comprising
      a dual bypass valve comprising
         a first inlet port selectively connectable to a first bypass port and a first discharge port,
         a second inlet port selectively connectable to a second bypass port and a second discharge port, and
         a movable spool arranged to modulate fuel flow from the first inlet port to the first bypass port and the first discharge port and arranged to modulate fuel flow from the second inlet port to the second bypass port and the second discharge port based at least in part on a position of the spool,
      a first positive displacement pump arranged to supply fuel to the first inlet port,
      a second positive displacement pump arranged to supply fuel to the second inlet port,
      a supply header arranged to supply fuel to the first pump and the second pump,
      a bypass header fluidically coupled to the first bypass port, the second bypass port, and the supply header,
      a discharge header fluidically coupled to the first discharge port and the second discharge port; and
   a control valve assembly fluidically coupled to the dual bypass valve to modulate fuel pressure in the discharge header, the control valve assembly comprising an electrohydraulic servo valve operatively coupled to an electronic engine controller, and a servo valve operatively coupled to direct pressurized fuel to the dual bypass valve to position the movable spool of the dual bypass valve as directed by the electronic engine controller, the servo valve being operatively coupled to be actuated by pressurized fuel received from the electrohydraulic servo valve.

8. The fuel supply system of claim 7, wherein, in a first position, the movable spool modulates fuel flow from the first inlet port between the first discharge port and the first bypass port and directs substantially all fuel flow from the second inlet port to the second bypass port; and wherein, in a second position, the movable spool directs substantially all fuel flow from the first inlet port to the first discharge port and modulates fuel flow from the second inlet port between the second discharge port and the second bypass port.

9. The fuel supply system of claim 7, further comprising a pressure transducer operatively coupled to the discharge header and arranged to provide an electrical signal to the electronic engine controller corresponding to fuel pressure in the discharge header.

10. The fuel supply system of claim 7, further comprising a check valve operatively disposed in the discharge header, the check valve being arranged to substantially prevent flow from the first discharge port to the second discharge port and to allow flow from the second discharge port through the discharge header.

11. The fuel supply system of claim 7, wherein the first pump comprises one of a vane pump and a gerotor pump.

12. The fuel pumping assembly of claim 7, wherein the second pump comprises one of a vane pump and a gerotor pump.

13. A fuel supply system, comprising:

a dual pump/dual bypass fuel pumping assembly comprising a dual bypass valve comprising a first inlet port selectively connectable to a first bypass port and a first discharge port, a second inlet port selectively connectable to a second bypass port and a second discharge port, and a movable spool arranged to modulate fuel flow from the first inlet port to the first bypass port and the first discharge port and arranged to modulate fuel flow from the second inlet port to the second bypass port and the second discharge port based at least in part on a position of the spool, a first positive displacement pump arranged to supply fuel to the first inlet port, a second positive displacement pump arranged to supply fuel to the second inlet port, a supply header arranged to supply fuel to the first pump and the second pump, a bypass header fluidically coupled to the first bypass port, the second bypass port, and the supply header, a discharge header fluidically coupled to the first discharge port and the second discharge port; and a control valve assembly fluidically coupled to the dual bypass valve, the control valve assembly comprising a metering valve operatively disposed in the discharge header, the metering valve modulating fuel flow through the discharge header, an electrohydraulic servo valve operatively coupled to position the metering valve as directed by an electronic engine controller, and a spool valve operatively coupled to the metering valve and the dual bypass valve to direct pressurized fuel to the dual bypass valve to position the movable spool of the dual bypass valve to maintain a desired pressure differential across the metering valve.

14. The fuel supply system of claim 13, wherein, in a first position, the movable spool modulates fuel flow from the first inlet port between the first discharge port and the first bypass port and directs substantially all fuel flow from the second inlet port to the second bypass port; and wherein, in a second position, the movable spool directs substantially all fuel flow from the first inlet port to the first discharge port and modulates fuel flow from the second inlet port between the second discharge port and the second bypass port9. The fuel supply system of claim 7, further comprising a pressure transducer operatively coupled to the discharge header and arranged to provide an electrical signal to the electronic engine controller corresponding to fuel pressure in the discharge header.

15. The fuel supply system of claim 13, wherein the spool valve is operatively coupled to the metering valve for actuation using fuel pressure upstream and downstream of the metering valve.

16. The fuel supply system of claim 13, further comprising a pressurizing valve downstream of the metering valve, the pressurizing valve being arranged to provide a predetermined downstream reference pressure to the metering valve.

17. The fuel supply system of claim 13, further comprising a linear variable differential transformer operatively coupled to the metering valve and the electronic engine controller to provide an electrical signal corresponding to a position of the metering valve to the electronic engine controller.

18. The fuel supply system of claim 13, wherein the first pump comprises one of a vane pump and a gerotor pump.

19. The fuel pumping assembly of claim 13, wherein the second pump comprises one of a vane pump and a gerotor pump.

* * * * *

UNITED STATES PATENT AND TRADEMARK OFFICE
CERTIFICATE OF CORRECTION

| | | |
|---|---|---|
| PATENT NO. | : 8,951,021 B2 | Page 1 of 1 |
| APPLICATION NO. | : 13/744914 | |
| DATED | : February 10, 2015 | |
| INVENTOR(S) | : Hutto, Jr. | |

It is certified that error appears in the above-identified patent and that said Letters Patent is hereby corrected as shown below:

In The Specification

In Column 4, Line 13, delete "flowhigh flow" and insert -- flow --, therefor.

In The Claims

In Column 9, Line 34, in Claim 12, delete "fuel pumping assembly" and insert -- fuel supply system --, therefor.

In Column 10, Lines 29-34, in Claim 14, delete "port9. The fuel supply system of claim 7, further comprising a pressure transducer operatively coupled to the discharge header and arranged to provide an electrical signal to the electronic engine controller corresponding to fuel pressure in the discharge header." and insert -- port. --, therefor.

In Column 10, Line 50, in Claim 19, delete "fuel pumping assembly" and insert -- fuel supply system --, therefor.

Signed and Sealed this
Twenty-third Day of February, 2016

Michelle K. Lee
*Director of the United States Patent and Trademark Office*